United States Patent
Ookawa et al.

(10) Patent No.: US 7,209,327 B2
(45) Date of Patent: Apr. 24, 2007

(54) MAGNETORESISTIVE HEAD HAVING MAGNETIC DOMAIN CONTROL FILM IN CONTACT WITH UNDERLAYER AND WITH ENDS OF FREE LAYER

(75) Inventors: Norihiro Ookawa, Fujisawa (JP); Shuichi Kojima, Fujisawa (JP); Koji Okazaki, Fujisawa (JP); Satoshi Shigematsu, Fujisawa (JP); Yasunari Tajima, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 340 days.

(21) Appl. No.: 10/676,415

(22) Filed: Sep. 30, 2003

(65) Prior Publication Data

US 2004/0190206 A1    Sep. 30, 2004

(30) Foreign Application Priority Data

Mar. 31, 2002   (JP)  ............................. 2003-093134

(51) Int. Cl.
    *G11B 5/39*    (2006.01)
(52) U.S. Cl. ............................................... 360/324.12
(58) Field of Classification Search ............ 360/324.12
    See application file for complete search history.

(56) References Cited

U.S. PATENT DOCUMENTS

| 5,436,778 | A | 7/1995 | Lin et al. ............... 360/327.32 |
| 6,238,531 | B1 * | 5/2001 | Pinarbasi ............... 204/298.04 |
| 6,278,595 | B1 | 8/2001 | Xue et al. .............. 360/327.31 |
| 6,322,911 | B1 | 11/2001 | Fukagawa et al. .......... 428/810 |
| 6,338,899 | B1 * | 1/2002 | Fukuzawa et al. ..... 360/324.12 |
| 6,428,714 | B1 * | 8/2002 | Torng et al. .................. 216/22 |
| 6,447,689 | B1 * | 9/2002 | Torng et al. .................. 216/22 |
| 2004/0170867 | A1 * | 9/2004 | Chang et al. ............... 428/692 |

FOREIGN PATENT DOCUMENTS

JP    2002151755 A    5/2002

* cited by examiner

*Primary Examiner*—Julie Anne Watko
(74) *Attorney, Agent, or Firm*—Townsend and Townsend and Crew LLP

(57) ABSTRACT

A magnetic domain control underlayer is formed below a magnetoresistive multi-layered film thereby bringing the magnetic domain control film into contact with both lateral end faces of a free layer and appropriate magnetic domain control can be attained in a state of minimizing a surplus bias magnetic field from the magnetic domain control film.

6 Claims, 13 Drawing Sheets

FIG. 9(a) ΔV-H waveform

MAGNETORESISTIVE HEAD HAVING MAGNETIC DOMAIN CONTROL FILM IN CONTACT WITH UNDERLAYER AND WITH ENDS OF FREE LAYER

CROSS-REFERENCE TO RELATED APPLICATIONS

This application claims priority to Japanese Application No. 2003-093134, filed Mar. 31, 2003, the entire disclosure of which is incorporated by reference for all purposes.

BACKGROUND OF THE INVENTION

The present invention relates to a magnetoresistive head and a manufacturing method thereof.

Figure 2:
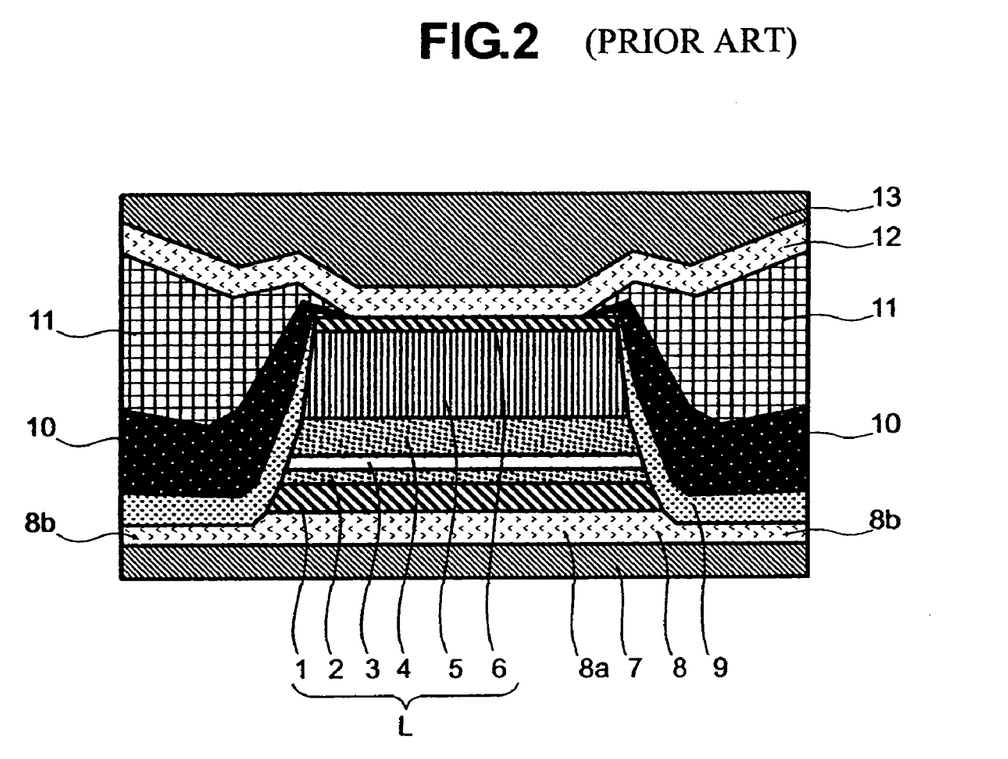
FIG. 2 is a cross sectional view of an existing sensor portion of a magnetoresistive head as viewed from an air bearing surface.

FIG. 2 is a cross sectional view of a sensor portion of a magnetoresistive head in described in Japanese Patent Laid-Open No. 2002-151755 as viewed from an air bearing surface. At first, as shown in FIG. 2, a multi-layered film L is formed with a free layer 2, a non-magnetic layer 3, a pinned layer 4, an anti-ferromagnetic layer 5, and a cap layer 6 on an underlayer 1.

Further, a protruded portion 8a is formed at the central area of a lower dielectric gap layer 8, and extended portion 8b extending in the direction of the track width is formed from both lateral end faces of the protruded portion 8a in the direction of the track width. The multi-layered film L is stacked on the protruded portion 8a.

Further, a magnetic domain control underlayer 9 made of Cr is formed from a portion on the extended portion 8b to both end faces of the multi-layered film L in the lateral direction of the track width. Further, a magnetic domain control film 10 is formed on the magnetic domain control underlayer 9. The magnetic domain control underlayer 9 is used for improving the magnetic characteristics (coercive force or the like) of the magnetic domain control film 10. Then, an electrode film 11 is formed on the magnetic domain control film 10.

In this case, magnetization of the free layer 2 is aligned in the direction of the track width and the magnetic domain of the free layer 2 is controlled by a bias magnetic field from the magnetic domain control film 10.

Figures 3, 3A, 3B:
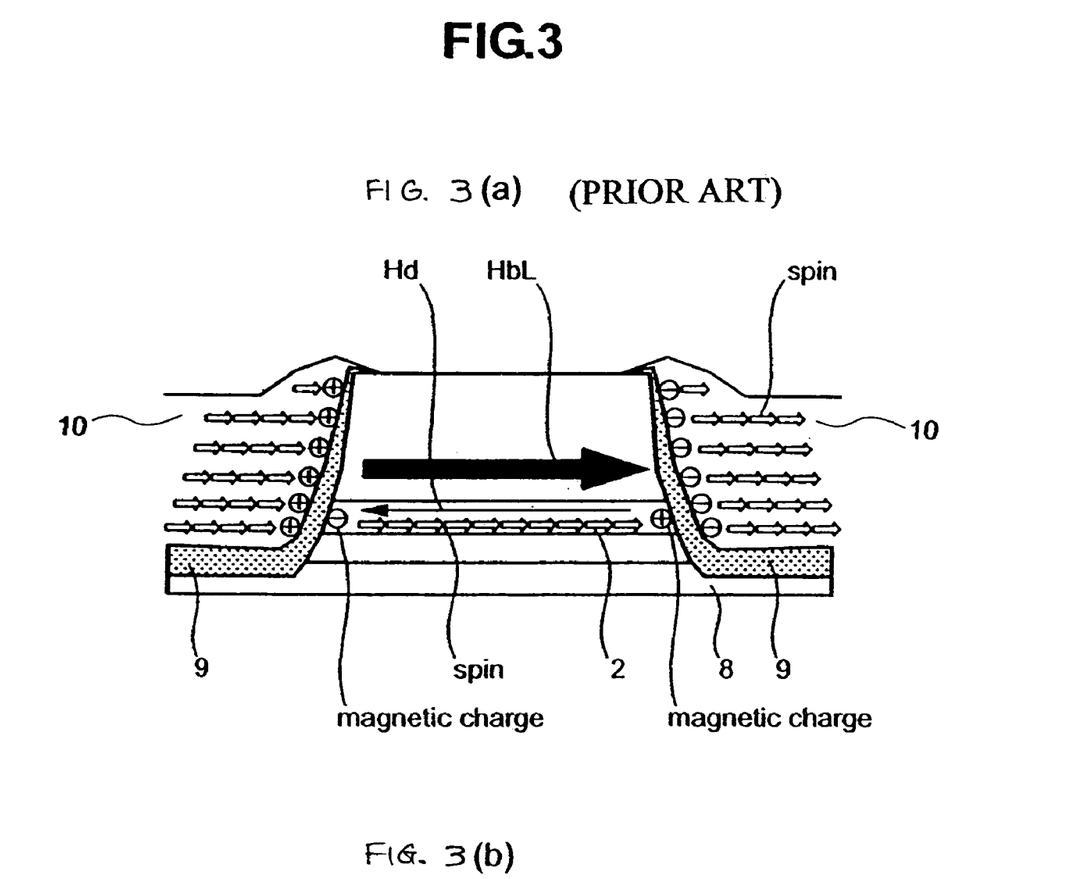

FIG. 3(a) is a view schematically showing magnetic charges, bias magnetic field HbL, anti-magnetic field Hd of free layer 2, and exchange interaction Jex in the sensor portion of an existing magnetoresistive head.

In the existing structure shown in FIG. 3(a), magnetic charges are generated on both right and left end of the free layer, to form anti-magnetic field Hd in the direction opposite to the magnetizing direction of the free layer in the inside of the free layer. This makes the control of the magnetic domain difficult. In order to obtain favorable reading characteristics with less head noise, it is necessary to provide a sufficient bias magnetic field HbL from the magnetic domain control film 10 to the free layer 2 thereby controlling the magnetic domain of the free layer 2.

However, when a sufficient bias magnetic field HbL is applied to the free layer 2, low sensitivity regions (dead zones) are formed on both right and left ends of the free layer 2 and lower the read output of the head. Further, to avoid the generation of the anti-magnetic field Hd, it is possible to remove the magnetic domain control underlayer 9 to provide direct contact of the magnetic domain control film 10 with the free layer 2. However, since the coercive force of the magnetic domain control film 10 is decreased, the magnetic domain of the free layer 2 cannot be controlled properly.

The present invention intends to solve the foregoing problems and provide a magnetoresistive head capable of properly controlling the magnetic domain of the free layer and a manufacturing method thereof.

SUMMARY OF THE INVENTION

The present invention has a feature in the magnetoresistive head in which a magnetic domain control film underlayer is formed below both lateral ends in the direction of the track width of the multi-layered film, and a magnetic domain control film is in contact with both lateral end faces of a free layer in the direction of the track width.

FIG. 3(b) is a view schematically showing magnetic charges, bias magnetic field HbL, free layer anti-magnetic field Hd, and exchange interaction Jex in the magnetoresistive head according to the present invention. As shown in FIG. 3(b). According to the invention, a magnetic domain control film is in contact with both lateral end faces of the free layer in the direction of the track width. Accordingly, magnetic charges are not generated on both right and left ends of the free layer, and no anti-magnetic field Hd is generated in the free layer. Accordingly, magnetic domain control is facilitated.

Further, as shown in FIG. 3(b), since exchange interaction Jex exerts between the spin on both lateral end faces of the free layer in the direction of the track width and the spin of the magnetic domain control film, the direction of the spin of the free layer is controlled. Accordingly, it is possible to decrease the bias magnetic field necessary for the magnetic domain control of the free layer to properly control the magnetic domain.

Further, in the invention, the magnetic domain control film is formed in contact on the magnetic domain control underlayer at the outside of the both lateral end faces in the direction of the track width of the multi-layered film, and the coercive force of the magnetic domain control film can be increased.

BRIEF DESCRIPTION OF THE DRAWINGS

FIG. 3 (which includes FIGS. 3(a) and 3(b)) is a view schematically showing magnetic charges, bias magnetic field HbL, anti-ferromagnetic field Hd of free layer, and exchange interaction Jex in a sensor portion of a magnetoresistive head;

FIG. 9 (which includes FIGS. 9(a), 9(b), 9(c), 9(d), and 9(e)) is a view explaining an operation principle regarding a transfer curve;

FIG. 11 (which includes FIGS. 11a and 11b) is a view comparing the transfer curve characteristic values of the sensor portions for the magnetoresistive head of the invention and that of the prior art;

The following table includes a description of reference numerals, and is a useful legend for the different layers shown in various ones of the figures.

TABLE 1

| | |
|---|---|
| 1 | underlayer |
| 2 | free layer |
| 3 | non-magnetic layer |
| 4 | pinned layer |
| 5 | anti-ferromagnetic layer |
| 6 | cap layer |
| 7 | lower magnetic shield |
| 8 | lower dielectric gap layer |
| 8a | lower dielectric gap layer protruded portion |
| 8b | lower dielectric gap layer extended portion |
| 9 | magnetic domain control underlayer |
| 10 | magnetic domain control film |
| 11 | electrode film |
| 12 | upper dielectric gap layer |
| 13 | upper magnetic shield |
| 14 | resist |
| 15 | lower magnetic shield |
| 16 | dielectric layer |
| 17 | magnetoresistive multi-layered film |
| 18 | dielectric layer |
| 19 | upper magnetic shield |
| 20 | dielectric layer |
| 21a | lower magnetic pole |
| 21b | lower magnetic pole protrusion |
| 22a | upper magnetic pole 1 |
| 22b | upper magnetic pole |
| 23 | coil |
| 24 | dielectric layer |
| L | multi-layered film |
| M | magnetic domain control stack |

DESCRIPTION OF ILLUSTRATIVE EMBODIMENTS

Figure 1:
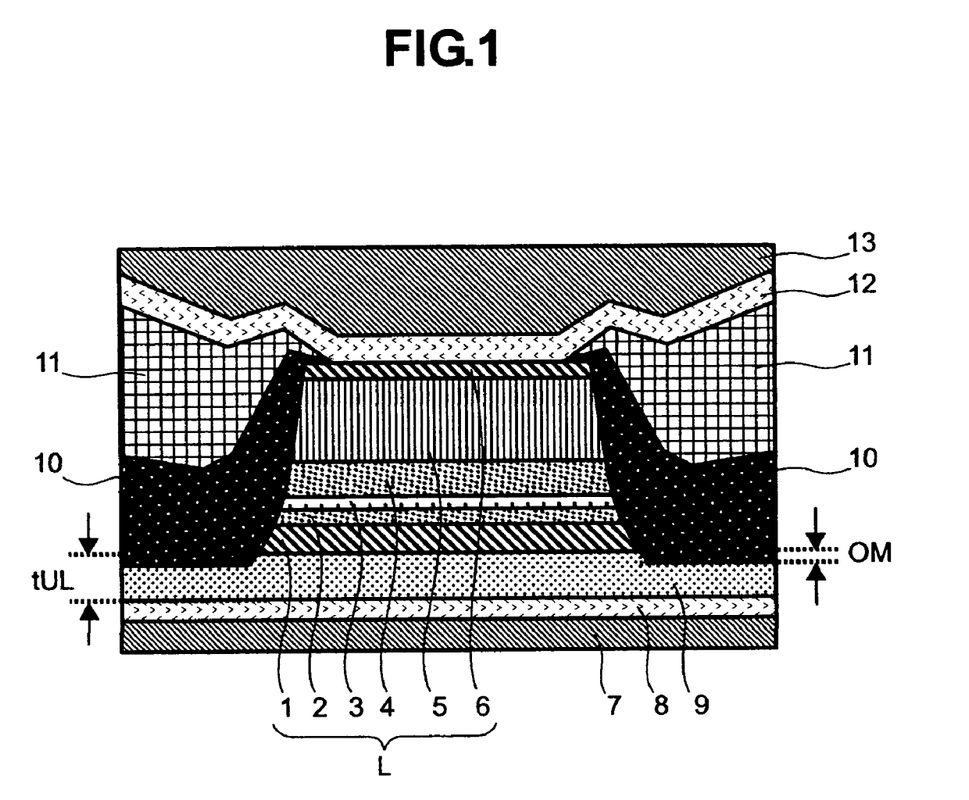
FIG. 1 is a cross sectional view of a sensor portion of a magnetoresistive head according to a first embodiment of the invention as viewed from an air bearing surface.

FIG. 1 is a cross sectional view of a sensor portion of a magnetoresistive head according to a first embodiment of the present invention as viewed from an air bearing surface. A lower magnetic shield 7 made of a soft magnetic material such as an NiFe alloy is formed on a substrate (not illustrated), and, successively, a lower dielectric gap layer 8 comprising a dielectric material such as an $Al_2O_3$—$SiO_2$ compound is formed. A magnetic domain control underlayer 9 is formed on the lower dielectric gap layer 8. The magnetic domain control underlayer 9 is formed by using a non-magnetic material selected from one or more of Cr, Ti, W, Mo, V, Mn, Nb, and Ta.

A multi-layered film L is formed on the magnetic domain control underlayer 9. The multi-layer film L is configured as a so-called single spin valve type with upper stacked anti-ferromagnetic-layer. Each of the layers constituting the multi-layered film L will now be described.

At first, an underlayer 1 is formed on the magnetic domain control underlayer 9. The underlayer 1 is formed of a non-magnetic material such as Ta or NiFeCr, which may be not only a single but also a stacked structure. A free layer 2 is formed on the underlayer 1. The free layer 2 is formed, for example, of an NiFe alloy, CoFe alloy, or Ru, which may be not only a single layer but also a stacked structure. A non-magnetic layer 3 comprising a non-magnetic conductive material such as Cu is formed on the free layer 2. A pinned layer 4 is formed on the non-magnetic layer 3. The pinned layer 4 is formed, for example, of a CoFe alloy or Ru, which may be not only a single layer but also a stacked structure. An anti-ferromagnetic layer 5 formed, for example, of PtNn is formed on the pinned layer 4. The magnetizing direction of the pinned layer 4 is fixed in one direction by the anti-ferromagnetic layer 5. A cap layer 6 formed of a non-magnetic material such as Ta is formed on the anti-ferromagnetic layer 5.

A magnetic domain control film 10 formed of a CoCrPt alloy is formed on both end faces of the multi-layered film L in the direction of the track width. Since this provides a structure in which the magnetic domain control film 10 is in contact with both lateral end faces of the multi-layered film L, the bias magnetic field necessary for the magnetic domain control for the free layer 2 can be decreased to obtain high read output.

An electrode film 11 is formed on the magnetic domain control film 10 for supplying electric current to the multi-layered film L. The electrode film 11 is formed, for example, of Cr, Ta, TaW alloy, or Au, which may be not only a single layer but also a stacked structure. Further, a protection film comprising a dielectric material such as an $Al_2O_3$—$SiO_2$ compound may be formed on the electrode film 11.

An upper dielectric gap layer 12 comprising a dielectric film such as an $Al_2O_3$—$SiO_2$ compound is formed on the electrode film 11 and the cap layer 6. An upper magnetic shield 13 comprising a soft magnetic material such as an NiFe alloy is formed on the upper dielectric gap layer 12.

Figure 4:
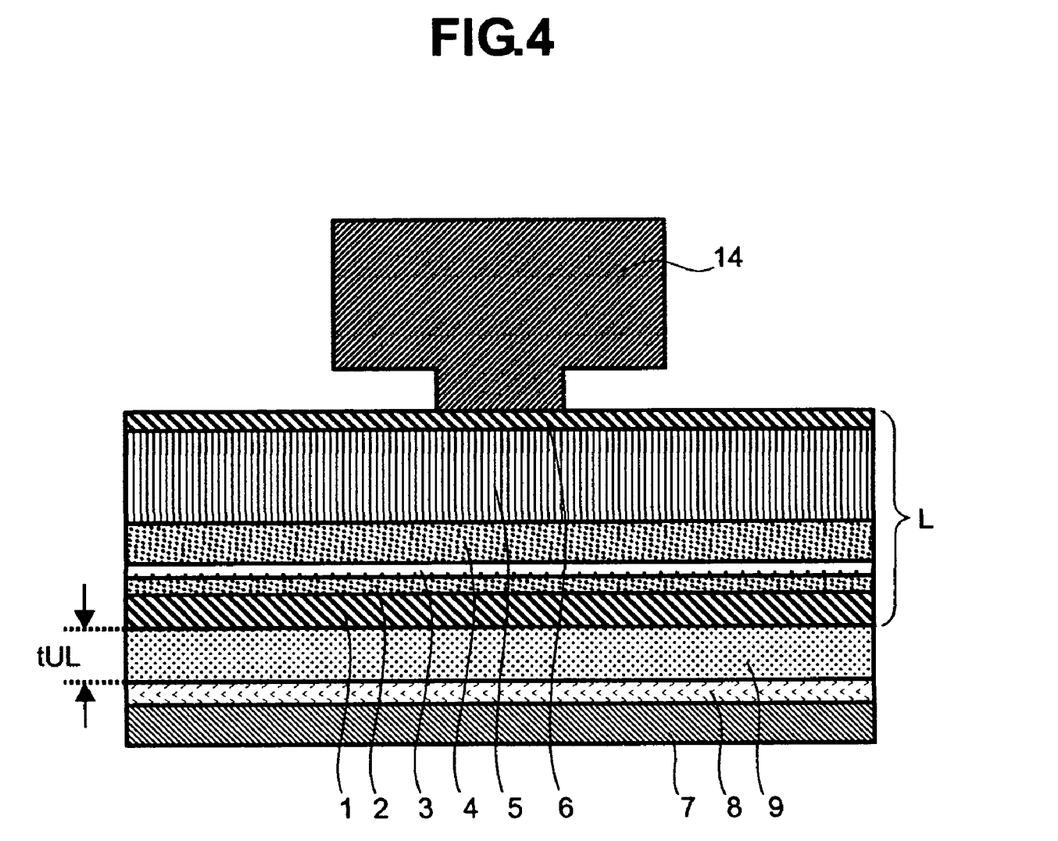
FIG. 4 is a view of a step of a first embodiment as a method of manufacturing a sensor portion of a magnetoresistive head according to the invention.
Figure 5:
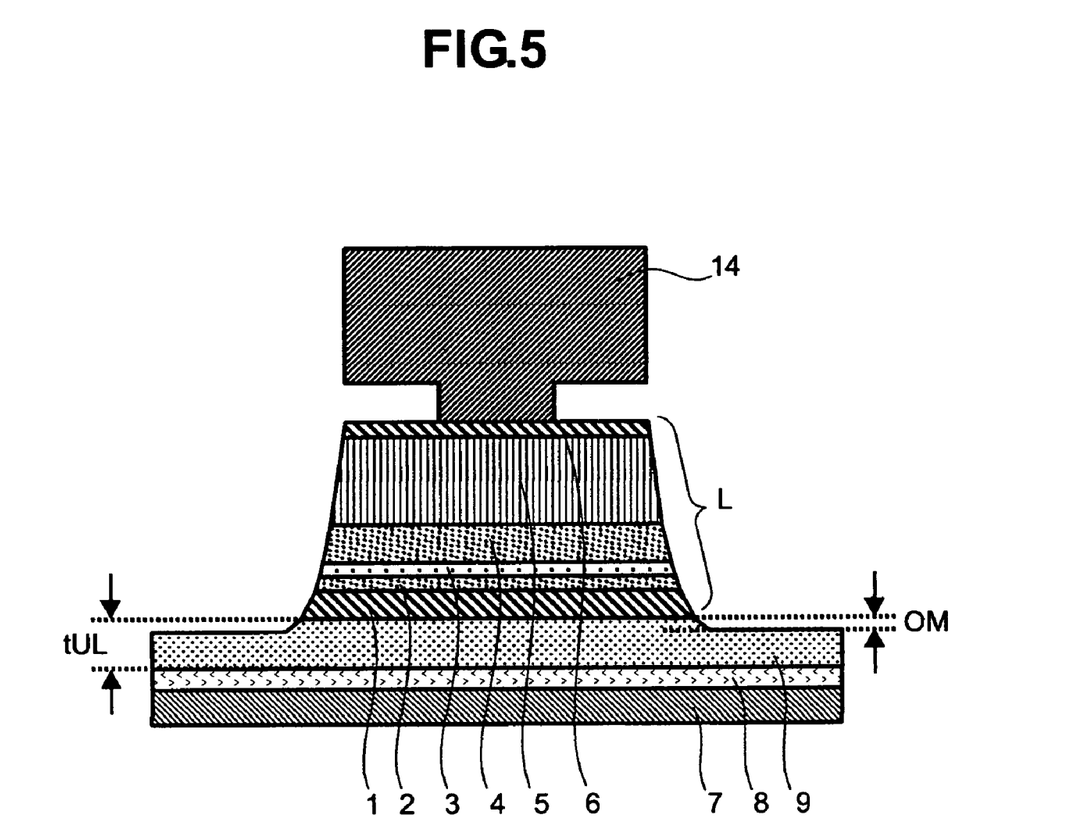
FIG. 5 is a view of a step of a first embodiment as a method of manufacturing a sensor portion of a magnetoresistive head according to the invention.
Figure 6:
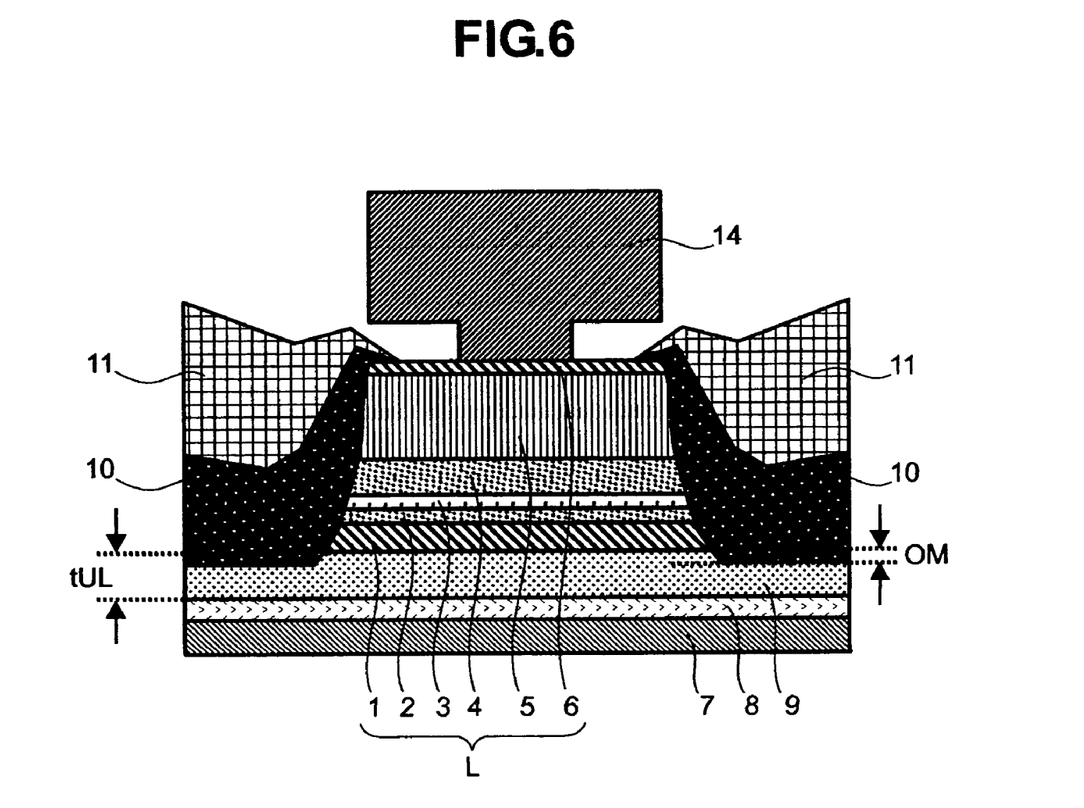
FIG. 6 is a view of a step of a first embodiment as a method of manufacturing a sensor portion of a magnetoresistive head according to the invention.

FIGS. 4, 5, and 6 show a method of manufacturing a sensor portion of a magnetoresistive head. At first, as shown in FIG. 4, a lower magnetic shield 7, a lower dielectric gap layer 8, and a magnetic domain control underlayer 9 are formed on a substrate (not illustrated), and a multi-layered film L having an underlayer 1, a free layer 2, a non-magnetic layer 3, a pinned layer 4, an anti-ferromagnetic layer 5, and a cap layer 6 is formed on the magnetic domain control underlayer. A resist layer 14 for lift off is formed on the multi-layered film L. The thickness of the magnetic domain control underlayer 9 indicated on the nm unit is defined as tUl.

In this process, it is preferable that atmospheric exposure be conducted as a pretreatment for the underlayer 1, and then plasma oxidation applied (pure oxygen gas, at a gas pressure of 0.9 Pa, RF power of 15 W, for 60 sec of time) since the MR ratio of the multi-layered film is improved. Further, it is preferable that the underlayer 1 be constituted such that Ta is initially deposited by 1 nm followed by atmospheric exposure and then an optional layer is deposited thereon since the coercive force Hcf of the free layer and the interlayer coupling magnetic field Hint are substantially equal to those of the existing structure shown in FIG. 2

(structure with no magnetic domain control underlayer 9 below the multi-layered film L).

Then, as shown in FIG. 5, portions for the multi-layered film L and the magnetic domain control underlayer 9 not covered with the resist layer 14 are removed by using, for example, ion milling. The amount of over milling relative to the magnetic domain control underlayer 9 indicated on nm unit is defined as OM.

Then, as shown in FIG. 6, a magnetic domain control film 10 is deposited to the lateral side of the multi-layered film L and on the magnetic domain control underlayer 9 on both sides thereof, and an electrode film 11 is formed on the magnetic domain control film 10. Finally, the resist layer 14 is removed, and an upper dielectric gap layer 12 and an upper magnetic shield 13 are formed respectively.

In this embodiment, since the resist layer is not present when the magnetic domain control underlayer is formed, the substrate can be heated. When the substrate is heated, the (200) face of the magnetic domain control underlayer is easily oriented in the direction parallel with the surface of the substrate. Also in this embodiment, when it is formed such that the relation between tUL and OM is: $0.8 \leq OM \leq tUL\ 2.2$ and $3.0 \leq tUL \leq 7.0$, the coercive force of the magnetic domain control film 10 can be increased.

Figure 7:
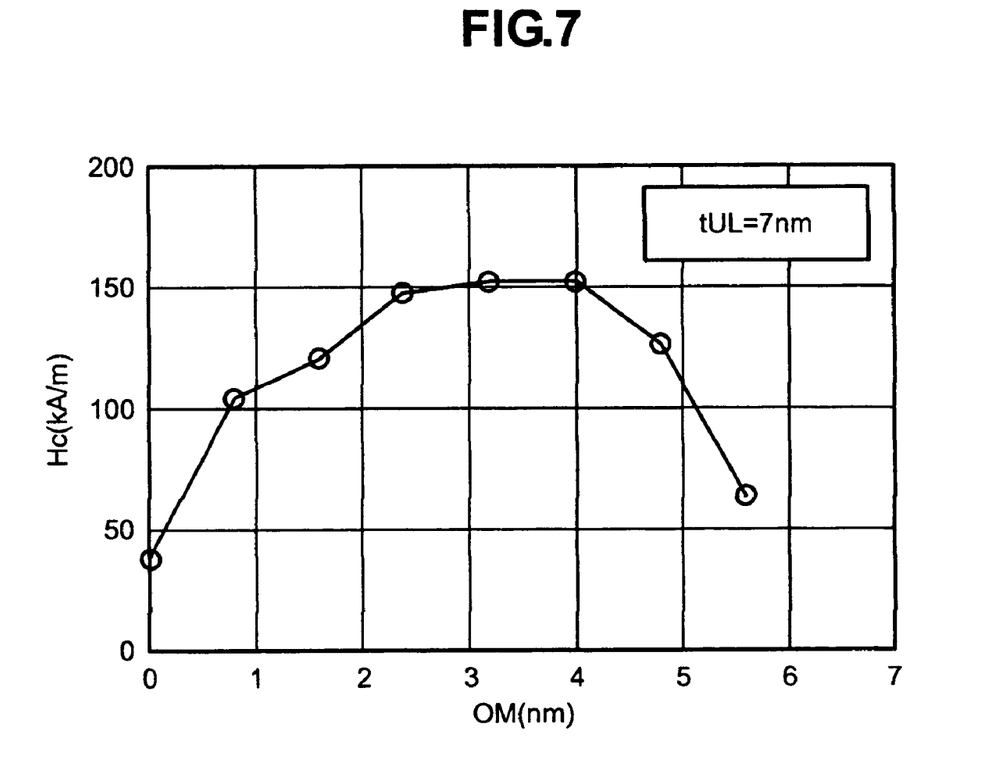
FIG. 7 is a graph showing a relation between the amount of over milling OM for the magnetic domain control underlayer and a coercive force Hc of the magnetic domain control film.

FIG. 7 is a graph showing the result of measuring the coercive force Hc of the magnetic domain control film when the amount of over milling OM relative to the magnetic domain control underlayer is changed in a sample obtained by forming a magnetic domain control underlayer and a multi-layered film from below in this order on an AlTiC substrate having an $Al_2O_3$ protection film formed on the surface, removing portions of the multi-layered film and the magnetic domain control underlayer by using ion milling, and then depositing a magnetic domain control film.

The magnetic domain control underlayer of the sample used for the measurement was formed by using Cr, and the magnetic domain control film was formed by using CoCrPt. The thickness of the magnetic domain control underlayer tUL was 7 nm and the thickness of the magnetic domain control film was 10 nm.

As shown in FIG. 7, when the amount of over milling OM is: $0.8\ nm \leq OM \leq 4.8\ nm$ (tUL-2.2), the coercive force exceeds 104 kA/m (1300 Oe), while the coercive force Hc decreases abruptly when OM<0.8 nm or OM>4.8 nm (tUL-2.2). When OM is 4.8 nm or more, necessary residual film thickness can no more be ensured. As a result, a preferred range for OM and tUL is defined as; $0.8 \leq OM \leq tUL\ 2.2$ and $3.0 \leq tUL < 7.0$.

Figure 8:
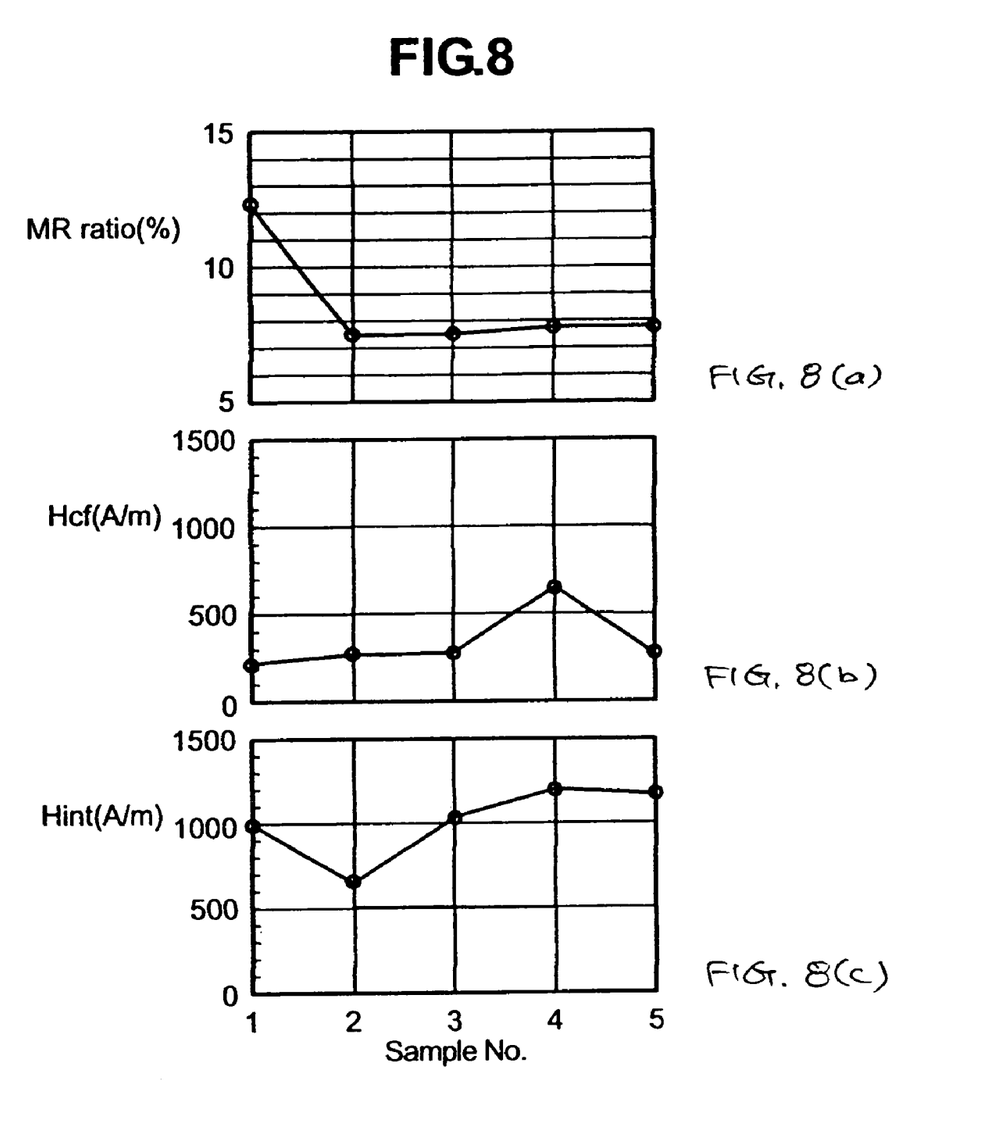
FIG. 8 includes graphs showing an MR ratio (FIG. 8a), a free layer coercive force Hcf (FIG. 8b), and an interlayer coupling magnetic field Hint (FIG. 8c) when changing magnetic domain control underlayer, pretreatment for underlayer deposition, and underlayer.

FIG. 8 includes graphs showing the result of measuring the MR ratio (FIG. 8a), the free layer coercive force Hcf (FIG. 8b) and the interlayer coupling magnetic field Hint (FIG. 8c) when the magnetic domain control underlayer, the pretreatment for the underlayer deposition or the underlayer were changed respectively in a sample obtained by forming successively a magnetic domain control underlayer and a multi-layered film (underlayer, anti-ferromagnetic layer, pinned layer, non-magnetic layer, free layer, and cap layer) from below on an AlTiC substrate in which an $Al_2O_3$ protection film is formed on the surface and an $Al_2O_3$—$SiO_2$ compound is stacked.

The conditions for forming Sample Nos. 1–5 are as shown in Table 2. Sample No. 1 is an existing example constituted only with a multi-layered film with no magnetic domain control underlayer, which is referred to hereinafter as a standard sample. Sample Nos. 2 to 4 are constituted with a magnetic domain control underlayer and a multi-layered film. The magnetic domain control underlayer was formed by using Cr to a thickness of 10 nm. Further, as the pretreatment for the underlayer deposition, a treatment comprising only atmospheric exposure (exposure in atmosphere for 5 min) or plasma oxidation (in pure oxygen gas, at a gas pressure 0.9 Pa, RF power of 15 W, for 60 sec of time) after atmospheric exposure was applied.

TABLE 2

| Sample No. | Magnetic domain control underlayer | Pretreatment for underlayer deposition | Underlayer |
|---|---|---|---|
| 1 | — | Atmospheric exposure | Underlayer A |
| 2 | Cr 10 nm | Atmospheric exposure | Underlayer A |
| 3 | Cr 10 nm | Atmospheric exposure | Ta 1 nm → Atmospheric exposure → underlayer A |
| 4 | Cr 10 nm | Atmospheric exposure → plasma oxidation | Underlayer A |
| 5 | Cr 10 nm | Atmospheric exposure → plasma oxidation | Ta 1 nm → Atmospheric exposure → underlayer A |

It can be seen from FIG. 8 that in the Sample Nos. 2 to 4 in which the magnetic domain control underlayer is deposited, MR ratio is decreased compared with the standard sample (Sample No. 1) because of the flow-in of a sense current to the magnetic domain control underlayer.

It can be seen from FIG. 8, in the Sample Nos. 2 to 4 in which the magnetic domain control underlayer is deposited, that the MR ratio is higher in the Sample Nos. 4 and 5 subjected to plasma oxidation after atmospheric exposure compared with the Sample Nos. 2 and 3 subjected only to the atmospheric exposure as the pretreatment for the underlayer.

When the Sample Nos. 2 and 3 subjected only to the atmospheric exposure as the pretreatment for the underlayer are compared to each other, the interlayer coupling magnetic field Hint is lowered in the Sample No. 2 using an underlayer A for the underlayer compared with the standard sample (Sample No. 1). On the other hand, the interlayer coupling magnetic field Hint of the Sample No. 3 in which 1 nm of Ta is deposited for the underlayer and the underlayer A is deposited after atmospheric exposure is substantially equal to that of the standard sample (Sample No. 1).

When the Sample Nos. 4 and 5 subjected to plasma oxidation after atmospheric exposure as the pretreatment for the underlayer are compared, the free layer coercive force Hcf is higher in the Sample No. 4 using the underlayer A for the underlayer compared with the standard sample (Sample No. 1). On the other hand, in the Sample No. 5 in which the underlayer is deposited after depositing Ta to 1 nm and the underlayer A is deposited under atmospheric exposure, the free layer coercive force Hcf is substantially equal to that of the standard sample (Sample No. 1).

From the foregoing result, it is preferred to conduct the plasma oxidation after the atmospheric exposure as the pretreatment for the underlayer since the MR ratio is improved, but only the atmospheric exposure may be applied. Further, it is preferred for the fabrication of the underlayer to deposit Ta by 1 nm, conduct atmospheric exposure, and then deposit an optional underlayer A thereon since the free layer coercive force Hcf and the interlayer coupling magnetic field Hint are substantially identical with those of the standard sample.

To verify the effect of the invention, it is necessary to prepare a magnetoresistive sensor as shown in FIG. 1 and measure a transfer curve showing the dependence of the magnetoresistive effect on the external magnetic field to conduct evaluation. The method of measuring and evaluating the transfer curve is shown below.

Figures 9, 9A, 9E:
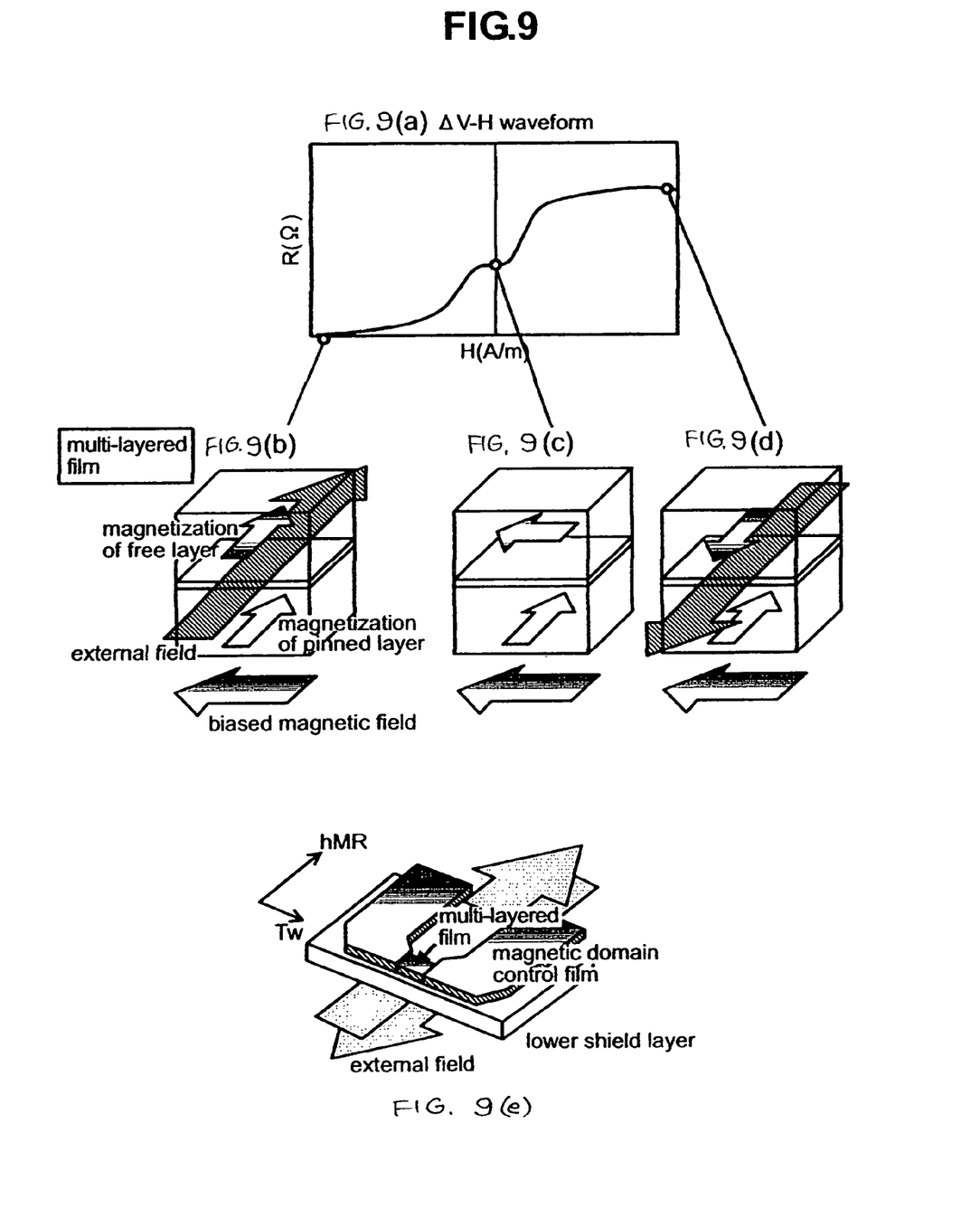

FIG. 9 (which includes FIGS. 9(a), 9(b), 9(c), 9(d), and 9(e)) shows an operation principle regarding the transfer curve. The external magnetic field is applied in the direction (hMR direction) perpendicular to the direction of the track width (Tw direction), and the magnetic resistance is measured (see FIG. 9(e)). Measurements obtained is shown as ΔV-H waveform in FIG. 9(a). The magnetic resistance becomes minimum when the magnetizing direction of the free layer is directed to the direction identical with the magnetizing direction of the pinned layer by the external magnetic field (FIG. 9(b)). The magnetic resistance becomes maximum when the magnetizing direction of the free layer is directed to the direction opposite to the magnetizing direction of the pinned layer by the external magnetic field (FIG. 9(d)). When the external magnetic field is zero, the magnetic charges in the free layer have to be perpendicular to the magnetizing direction imposed on the pinned layer by the bias magnetic field, and the induced magnetic field anisotropy added to the free layer (FIG. 9(c)). In this case, the magnetic resistance is at an intermediate value between the maximum value and the minimum value.

Figure 10:
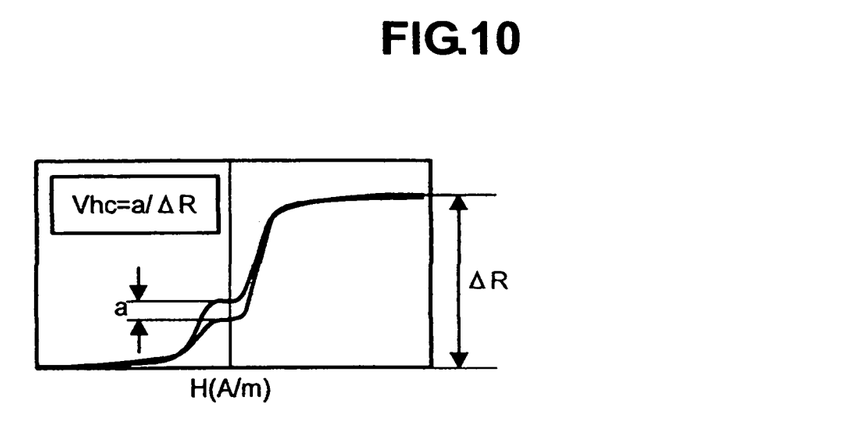
FIG. 10 (which includes FIGS. 10(a) and 10(b)) is a view explaining the amount of magnetic resistance change ΔR and a deviation Vhc of a transfer curve as characteristic values for the transfer curve.

In a case where the magnetic domain control for the free layer is insufficient or inappropriate, deviation is caused to the waveform near the zero magnetic field of the ΔV-H transfer curve. The example is shown in FIG. 10.

Figure 10B:
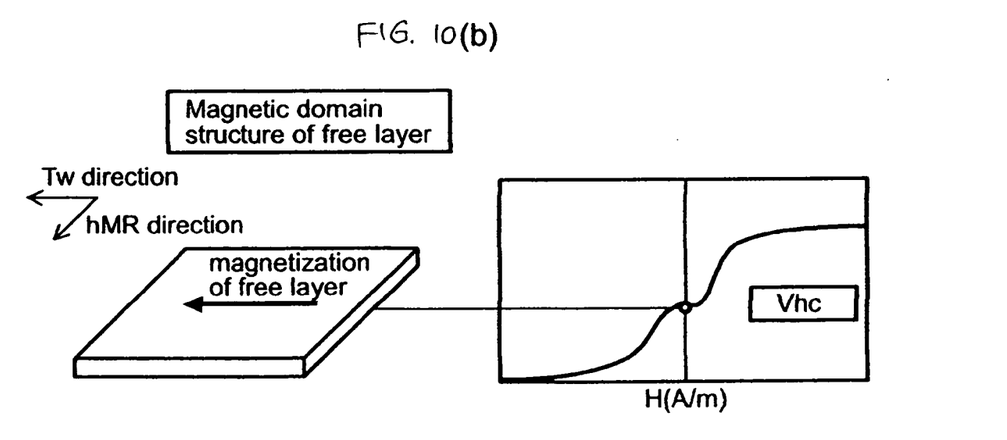

When hysteresis is generated in the magnetization state of the free layer near the externally applied magnetic field zero, deviation due to hysteresis is caused also to the transfer curve. Assuming the deviation as A and the amount of magnetic resistance change as ΔR, the ratio Vhc=a/ΔR is used as a characteristic value representing the deviation for the transfer curve. It has been well known that the deviation of the transfer curve increases in a case where the amount of residual magnetization of the magnetic domain control film is small and the bias magnetic field is insufficient, the production conditions for the free layer are not appropriate, or the magnetic characteristics of the magnetic domain control film are deteriorated. It is estimated that the deviation is caused to the transfer curve since the state of the magnetic domain of the free layer at the zero magnetic field is not controlled to a single magnetic domain but is in a complete magnetic domain state (FIG. 10(a)). On the contrary, in a case where the magnetic domain state at the zero magnetic field of the free layer is controlled to a single magnetic domain, the transfer curve is closed (FIG. 10(b)).

On the other hand, ΔR and Vhc of the transfer curve correspond to the output characteristics (head sensitivity, waveform fluctuation, etc.) and noise characteristics of a read head when writing and/or reading operation is conducted to the magnetic recording medium as an actual magnetic head. That is, those with small Vhc and with small deviation for the transfer curve are excellent in the noise characteristics. Accordingly, in a case where the multi-layered film (underlayer, anti-ferromagnetic layer, pinned layer, non-magnetic layer, free layer, and cap layer) is identical, it can be evaluated whether the magnetic domain control of the free layer is appropriate or not depending on the evaluation of Vhc.

Figures 11, 11A, 11B:
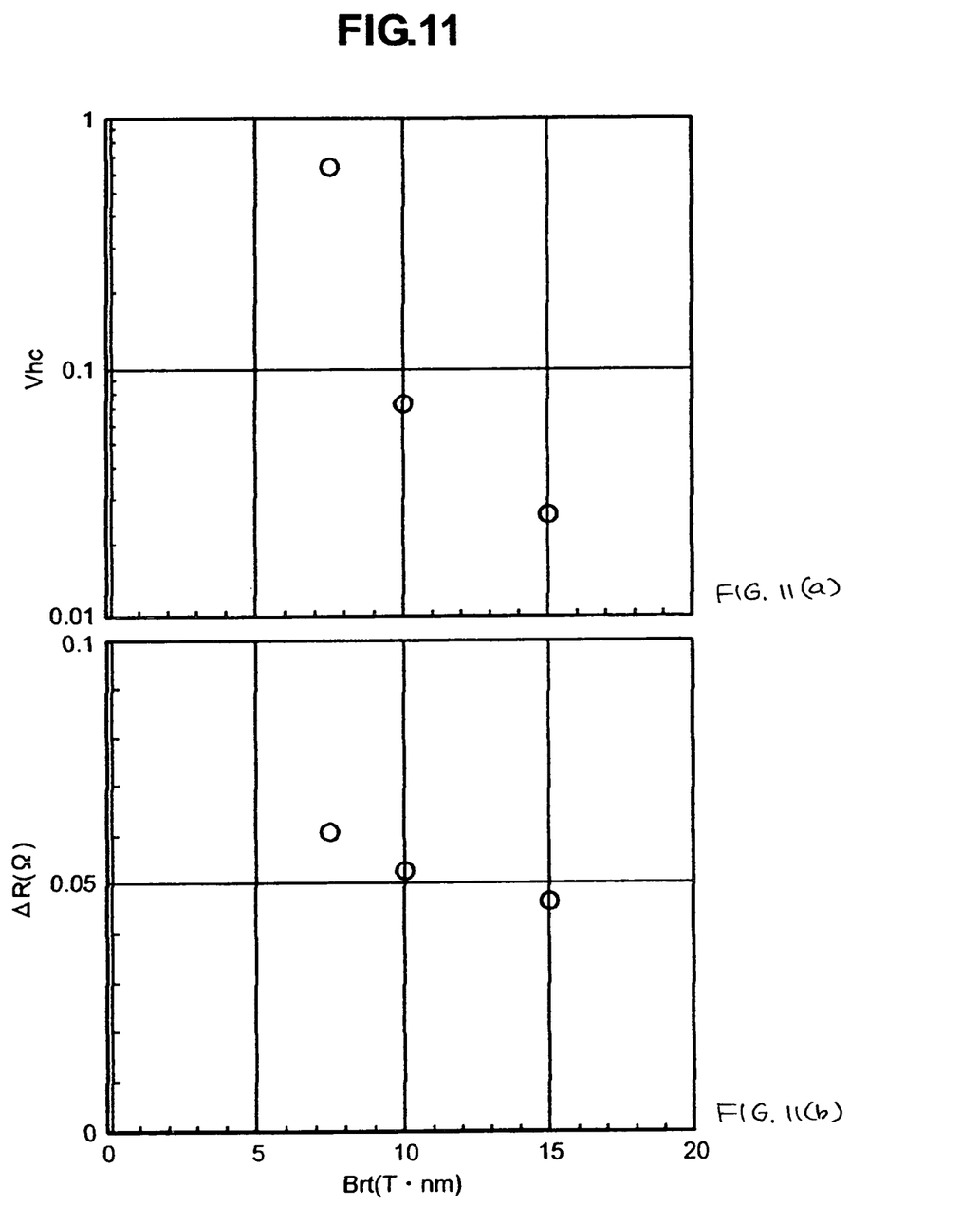

FIG. 11 includes graphs showing the result of measurement for Vhc (FIG. 11a) and ΔR (FIG. 11b) when a transfer curve was evaluated for the magnetoresistive head according to the invention shown in FIG. 1 while changing the residual magnetization Brt. For the magnetoresistive head used for measurement, the magnetic domain control underlayer was formed by using Cr and the magnetic domain control film was formed by using CoCrPt.

It can be seen from FIG. 11 that Vhc decreases as the residual magnetization Brt increases. In the structure of the invention, values: Vhc=0.026 and ΔR=0.046 Ω are obtained at Brt=15 (T·nm). From the foregoing result, a magnetoresistive head with low Vhc can be obtained in accordance with the structure of the invention and the magnetic domain of the free layer can be controlled properly.

Figure 13:
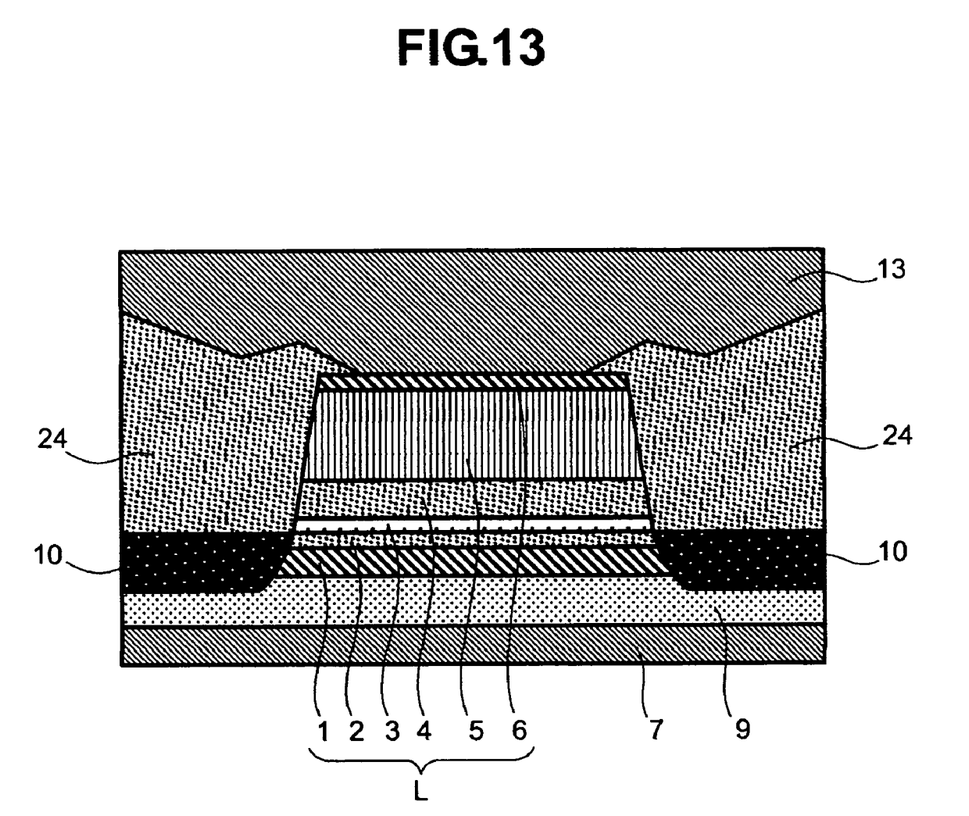
FIG. 13 is a cross sectional view of a sensor portion of a magnetoresistive head of a second embodiment in the invention as viewed from an air bearing surface.

FIG. 13 is a cross sectional view of a magnetic head of a second embodiment of the invention when a sensor portion of a magnetoresistive head is viewed from an air bearing surface. This structure provides a CPP type read head of supplying an electric current vertical to the film surface of the multi-layered film.

As shown in FIG. 13, a lower magnetic shield 7 comprising a soft magnetic material such as an NiFe alloy is formed on a substrate (not illustrated), and a magnetic domain control underlayer 9 is formed. The magnetic domain control underlayer 9 is formed by using a non-magnetic material selected from one or more of Cr, Ti, W, Mo, V, Mn, Nb, and Ta.

A multi-layered film L is formed on the magnetic domain control underlayer 9. The multi-layered film L is configured as a so-called single spin valve type with upper stacked anti-ferromagnetic layer. Description will be made for each of the layers constituting the multi-layered film L.

At first, an underlayer 1 is formed on the magnetic domain control underlayer 9. The underlayer 1 is formed of a non-magnetic material such as Ta or NiFeCr, which may be not only a single layer but also a stacked structure. A free layer 2 is formed on the underlayer 1. The free layer 2 is formed, for example, of an NiFe alloy, CoFe alloy, or Ru, which may be not only a single layer but also a stacked structure. A non-magnetic layer 3 comprising a non-magnetic conductive layer such as Cu or $Al_2O_3$ is formed on the free layer 2. A pinned layer 4 is formed on the non-magnetic layer 3. The pinned layer 4 is formed, for example, of a CoFe alloy or Ru, which may be not only a single layer but also a stacked structure. An anti-ferromagnetic layer 5 comprising, for example, PtMn is formed on the pinned layer 4. The magnetizing direction of the pinned layer 4 is fixed in one direction by the anti-ferromagnetic layer 5. A cap layer 6 comprising a non-magnetic material such as Ta is formed on the anti-ferromagnetic layer 5.

A magnetic domain control film 10 comprising a CoCrPt alloy is formed on both end faces of the underlayer 1 and the free layer 2 in the direction of the track width, and the magnetic domain control film 10 is not in contact with layers above the free layer 2. A dielectric layer 24 comprising, for example, $Al_2O_3$ is formed on the magnetic domain control film 10. An upper magnetic shield layer 13 comprising a soft magnetic material such as an NiFe alloy is formed on the dielectric layer 24 and the cap layer 6. The upper magnetic shield layer 13 serves also as an electrode and supplies electric current vertically to the film surface of the multi-layered film L. As described above, the structure of the invention is applicable also to a CPP type read head.

Figure 12:
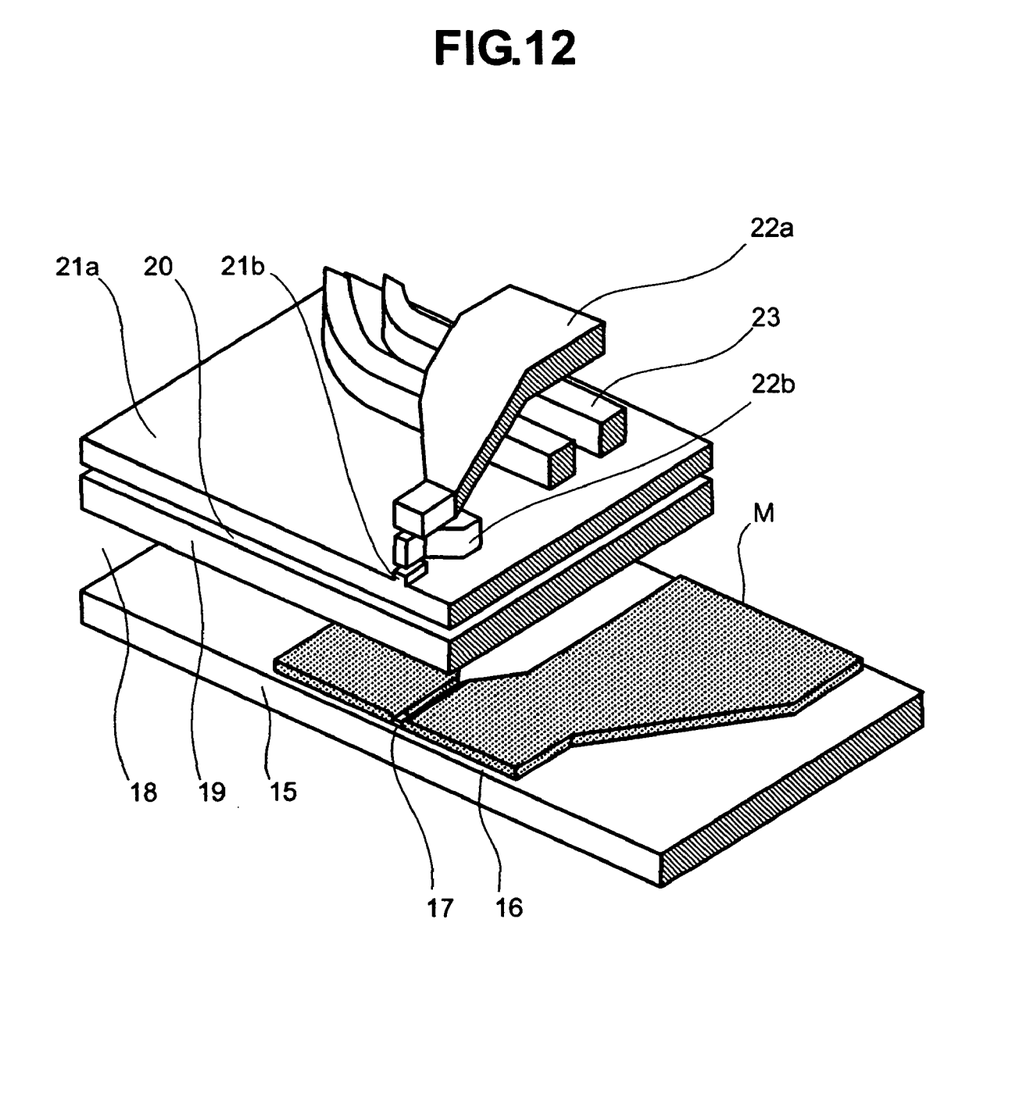
FIG. 12 is a perspective view of a magnetoresistive head according to the invention.

FIG. 12 is a conceptional perspective view of a magnetoresistive head according to an embodiment of the invention. A multi-layered film 17 having a magnetoresistive effect is present by way of a dielectric layer 16 above the lower magnetic shield 15, and a magnetic domain control stack M is in adjacent with the slopes on both ends thereof. An upper magnetic shield 19 is present by way of a dielectric layer 18 above the multi-layered film 17 and the magnetic domain control stack M. A lower magnetic pole 21a is present by way of a dielectric layer 20 above the upper magnetic shield 19. A portion of the lower magnetic pole 21a has a protruded structure 21b, and recording operation is conducted by the portion. Coils 23 and upper magnetic poles 22a and 22b are present above the lower magnetic pole 21a, and the tip end of the upper magnetic pole 22a is recessed from the air bearing surface to provide a structure retracted from the tip end of the magnetic pole 22b. By dividing the upper magnetic pole as 22a and 22b, magnetic fluxes generated in the magnetic pole by the current flowing through the coils 23 can be collected effectively to the top end portion to improve the recording characteristics. The write head may be of a vertical recording use having a main magnetic pole and an auxiliary magnetic pole.

As described above according to the present invention, the magnetic domain control film can be formed in contact with both lateral end faces of the free layer. Accordingly, the bias magnetic field necessary for the magnetic domain control of the free layer can be decreased and appropriate magnetic domain control can be conducted.

Further, in the invention, the magnetic domain control film is formed in contact on the magnetic domain control underlayer outside of the both lateral end surfaces in the direction of the track width of the multi-layered film that provides the magnetoresistive effect, which can improve the coercive force of the magnetic domain control film.

What is claimed is:

1. A magnetoresistive head comprising:
   a lower magnetic shield formed above a substrate;
   a magnetic domain control underlayer formed above the lower magnetic shield;
   a multi-layered film formed above the magnetic domain control underlayer, the multi-layered film comprising an underlayer, a free layer, a non-magnetic layer, a pinned layer, and an anti-ferromagnetic layer for pinning a magnetizing direction of the pinned layer;
   a magnetic domain control film formed above and being in contact with the magnetic domain control underlayer, said magnetic domain control film being in contact with both of lateral ends in the direction of the track width of the free layer, for conducting magnetic domain control of the free layer, the magnetic domain control underlayer configured to increase a coercive force of the magnetic domain control film;
   a pair of electrode films for supplying an electric current to the multi-layered film; and
   an upper magnetic shield formed above the multi-layered film and the electrode film.

2. The magnetoresistive head of claim 1 wherein the magnetic domain control underlayer is formed of a non-magnetic material selected from one or more of Cr, Ti, W, Mo, V, Mn, Nb, and Ta.

3. The magnetoresistive head of claim 1 wherein a relation between a film thickness of the magnetic domain control underlayer defined as tUL, and a distance between the upper end of the magnetic domain control underlayer and the lowermost portion of the magnetic domain control film defined as OM is: $0 \leq OM \leq tUL$.

4. A magnetoresistive head comprising:
   a lower magnetic shield formed above a substrate;
   a magnetic domain control underlayer formed above the lower magnetic shield;
   a multi-layered film formed above the magnetic domain control underlayer, the multi-layered film comprising an underlayer, a free layer, a non-magnetic layer, a pinned layer, and an anti-ferromagnetic layer for pinning a magnetizing direction of the pinned layer;
   a magnetic domain control film formed above and being in contact with the magnetic domain control underlayer, said magnetic domain control film being in contact with both of lateral ends in the direction of the track width of the free layer, for conducting magnetic domain control of the free layer, the magnetic domain control underlayer configured to increase a coercive force of the magnetic domain control film;
   a dielectric film formed above the magnetic domain control film; and
   an upper magnetic shield formed above the multi-layered film and the dielectric film.

5. The magnetoresistive head of claim 1 or 4 or 2 or 3 wherein the relation between tUL and OM is: $0.8 \leq OM \leq tUL\ 2.2$.

6. A magnetoresistive head comprising:
   a lower magnetic shield formed above a substrate;
   a magnetic domain control underlayer formed above the lower magnetic shield;
   a multi-layered film formed above the magnetic domain control underlayer, the multi-layered film comprising an underlayer, a free layer, a non-magnetic layer, a pinned layer, and an anti-ferromagnetic layer for pinning a magnetizing direction of the pinned layer;
   a magnetic domain control film formed above and being in contact with the magnetic domain control underlayer, said magnetic domain control film being in contact with both of lateral ends in the direction of the track width of the free layer, for conducting magnetic domain control of the free layer;
   a pair of electrode films for supplying an electric current to the multi-layered film; and
   an upper magnetic shield formed above the multi-layered film and the electrode film
   wherein the magnetic domain control underlayer is formed of a non-magnetic material selected from one or more of Cr, Ti, W, Mo, V, Mn, Nb, and Ta.

* * * * *